No. 867,725. PATENTED OCT. 8, 1907.
B. A. HEMENWAY.
LATHE TOOL AND HOLDER.
APPLICATION FILED MAY 16, 1907.
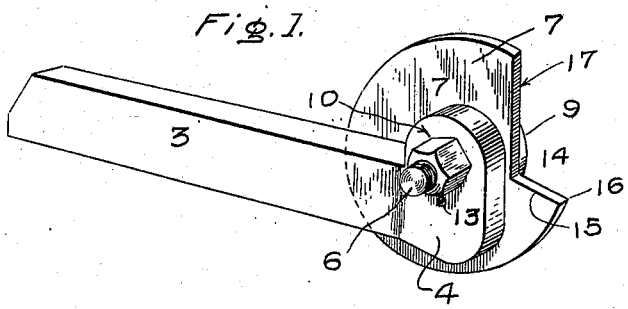
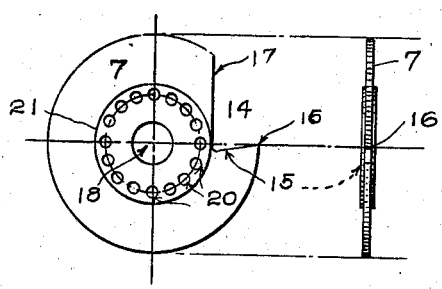
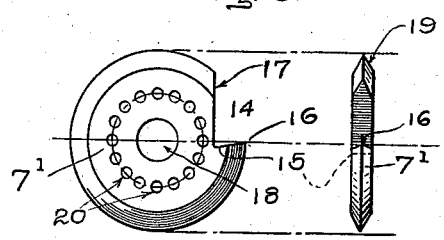
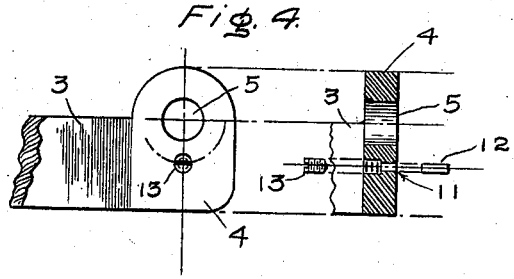
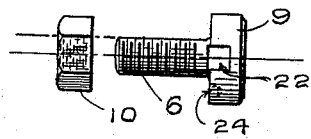
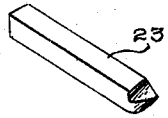
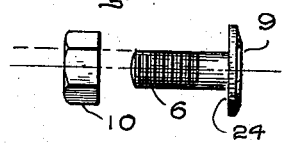
Witnesses:
M. G. Crozier.
R. L. Wallace.
Inventor,
Byron A. Hemenway,
by Harry D. Wallace
Atty.

UNITED STATES PATENT OFFICE.

BYRON A. HEMENWAY, OF WATERTOWN, NEW YORK.

LATHE TOOL AND HOLDER.

No. 867,725.      Specification of Letters Patent.      Patented Oct. 8, 1907.

Application filed May 16, 1907. Serial No. 374,072.

*To all whom it may concern:*

Be it known that I, BYRON A. HEMENWAY, a citizen of the United States, residing at Watertown, in the county of Jefferson and State of New York, have invented certain new and useful Improvements in Lathe Tools and Holders, of which the following is a specification.

This invention relates to improvements in lathe tools and holders, designed for use by machinists and the like, in connection with lathes of different kinds, and the invention relates particularly to a lathe tool which is part circular in form, and which is capable of being used for an indefinite number of operations, without requiring reforging or reforming.
Heretofore lathe tools employed for turning, cutting-off, facing and thread-cutting have been generally made by forging bar-tool-steel and forming the same into different shapes to suit the particular work required of them, then these tools have been tempered, and lastly ground in a manner to produce the desired cut. To prepare the old style tools by the method described requires a great deal of time and labor, and none but skilled smiths or mechanics can perform such work properly. The tempering of the cutting blades or parts is a delicate work, and frequently the tools become flawed in the course of heating and cooling and the tools thereafter break and require reforging. As a rule few lathemen are able to forge and dress such tools from day to day and preserve the uniformity and accuracy in the form of the cutters that is required for first class work, and great annoyance and trouble result.

It is the object of the present invention to obviate all such trouble and annoyance, to lessen the cost, and to save the great amount of time consumed in making and treating lathe tools, as described, by providing lathe tools which are always in the right form for the work, which requires no reshaping or retempering, and which need only to be ground to a slight extent occasionally to sharpen or otherwise keep them in order for service.
A further object is to provide lathe tools which may be used for an indefinite period of time, and may be ground and used repeatedly and still retain their correct form for cutting or turning.

A further object is to provide a holder or tool-stock for employment in connection with the lathe tools, and by means of which the tools are adjustable and interchangeable, and are capable of being applied to or removed from said holder in a quick and ready manner; the said adjustment and setting of said tools to a number of different positions in the common holder being accomplished by a simple operation, and a further object is to provide lathe tools of the class and a holder therefor, which are simple, strong, convenient and inexpensive, and which will stand considerable use and abuse and not get out of order.

The invention consists principally in providing lathe tools which are first formed circular, as disks, of suitable diameter and thickness for the class of work for which they are to be employed, and then cutting an angular section or part from each disk to form a cutting point, and said disks being perforated centrally to provide for attaching them to a holder, each of said disks being further provided with a series of sockets or notches formed in one side and arranged in a circle concentric with the central perforation for use in adjusting and holding the same when mounted in the holder; the invention further consists in providing tools or cutters of the class described, having their peripheral edges formed to different cross-sections in order to adapt them for different classes of work, such as turning, cutting-off, facing and thread-cutting, but otherwise forming the said tools for employment in connection with a common holder or stock; the invention further consists in providing a tool holder, comprising a shank or stock made of steel, the inner end of which is preferably formed into a head disposed at a slight angle to the body of the stock, and provided with a large perforation to receive a bolt employed for securing the tools to the head of said holder, the said bolt being held in place by a nut, and the invention further consists in providing simple but strong means for holding the tools from turning on the bolt except when the nut is loosened or removed.

Other features and parts of the invention will be fully understood from the detail description which follows and by reference to the accompanying drawing forming a part of this specification, and in which—

Figure 1 is a perspective view of my device, showing one of the tools attached to the holder ready for use. Fig. 2 is a side and edge view of a tool formed for cutting-off, showing a thin circular cutting blade; also showing means for mounting and adjusting the same on the holder. Fig. 3 is a side and edge view of a thread-cutting or turning tool, showing the edges beveled or chamfered to form the pitch of the threads; also showing means for mounting and adjusting the tool, the same as in Fig. 2. Fig. 4 is a compound view of the head of the tool-holder, showing perforation for bolt which holds the tools in place; also showing pin or stud which holds the tools from turning on the bolt, and manner of applying the same to holder. Fig. 5 is a detail view of a bolt and nut employed for attaching the circular tools to the holder, showing a square hole through the head to receive a common bar tool. Fig. 6 is a detail view of a modified form of bolt, and a nut therefor. Fig. 7 is a detail perspective view of a modified form of turning tool.

Similar characters of reference are assigned to corresponding parts throughout the several figures.

In the drawing, Fig. 1 illustrates my improved lathe tool and holder complete and ready to be applied to a lathe for cutting. The holder consists of a stock or shank 3, preferably made of steel and formed as shown. The stock may be forged in any other suitable form, but its inner end or head 4 is preferably bent or disposed at a slight angle to the stock, to facilitate adjusting and setting the same in the slide-rest of a lathe in a manner to hold the tool in true vertical position and to allow the tool to be run up close to the chuck or face-plate. 5 represents a hole formed transversely through the head 4, to receive a bolt 6 employed for removably and adjustably attaching and securing my improved tools 7 and 7′. The bolt 6 may partake of any suitable form, but is preferably provided with a broad circular head 9, of suitable size and strength, and the smaller end of said bolt is provided with threads, preferably cut left-handed to receive a nut 10 employed for holding the bolt in place and also for drawing the tools tightly against the inner face of the holder. The left-handed threads are required to prevent the nut from jarring loose while the tool is employed in cutting.

11 represents a small hole bored through head 4 of the holder parallel to hole 5, into which a metallic pin or stud 12, in the nature of a dowel, is tightly driven, the outer end of the stud should project an eighth of an inch or more from the inner side or face of the head where it engages the tools. The pin 12 preferably extends only part way through the hole 11, and the outer end of said hole is tapped and fitted with a small screw 13. The purpose of the screw is to keep dowel-pin 12, in case it should become loose, from working outwardly away from the tool, and it also affords a means of reaching the pin for driving it out in case it should become broken, and for replacing it with a new one.

The tools 7 and 7′ are preferably made in the first instance in the form of disks, and of a good quality of tool-steel, which may be tempered to suitable hardness to stand ordinary lathe work. After the disks are thus formed, and before they are hardened, the peripheral edges of the same are dressed or formed either V-shaped or square or otherwise, accordingly as the tools are to be employed for turning, thread-cutting, or merely for cutting-off work, as shown in Figs. 1, 2 and 3. After the disks 7 and 7′ have been operated on as described, an irregular-angled section or part is cut out of the outer rim or edge of each disk, so as to form a gap or ratchet-notch 14, substantially as shown in said figures. The lower or horizontal side 15 of notch 14, where it intersects with the peripheral edge of the tool forms the cutting point 16. The upper or vertical side 17 of the notch or gap 14 is cut back at such an angle from the line 15 as will give suitable clearance to the tool to permit it to cut into the metal operated upon a sufficient distance to do the required work.

The tools 7 and 7′ represent two different kinds of lathe cutters and comprise part of a set of several similarly formed. The tools of each set are detachable members provided with cutters and may be made to various diameters, but it is preferred that those of each set be made to the same diameter, but different sets may be made to different sizes to adapt them for lathe work of different kinds: for example, for cutting-off parts of small diameter, light turning and especially for thread-cutting, the disks need not be made over three or four inches in diameter, and from one eighth of an inch for cutting-off, to one quarter of an inch in thickness for turning and thread-cutting. But for turning and cutting larger articles, the tools may be made larger and heavier to suit the requirements, and the holder and related parts may also be made correspondingly larger and stronger.

18 represents a perforation made through the center of the disks 7 and 7′ of suitable diameter to permit the body of bolt 6 to pass through without being driven. The hole 18 is preferably made of the same diameter as hole 5 in the holder.

19 represents the beveled or chamfered edges of tools 7′, which are preferably formed to angles of 60° for the standard threads, while for ordinary turning the angles may be more or less sharp.

20 represents a series of small circular sockets or recesses formed in a boss 21 on one side of tool 7, and on the plain surface of tool 7′, preferably on the side which faces head 4 of the holder when the tools are mounted. These sockets should be a trifle deeper than the length of the projecting end of pin 12, and they are intended to register with and to receive said pin for the purpose of, first, holding the tools from turning on the bolt 6 when the strain of the cutting is exerted upon the tools and, second, to permit of the tools being adjusted to different positions in relation to the holder. These sockets are preferably formed close together and arranged in a circle around the central perforation 18, as shown, so as to permit the tools to be ground or dressed and used till the cutting point 16 recedes almost to the line 17 of the notch 14. In this way the tools may be used for a long time, or as long as there is sufficient of the cutting portion of the body or disk left to stand the strain of the work. The sockets 20 of each tool in a set, and the pin 12 of the holder for such set, are intended to be arranged so that the tools will be interchangeable.

After my tools have been made and finished in the manner described and shown, they will retain their original form at the cutting point or edge until the disks are ground or wasted entirely away, as explained, and when correctly formed in the first place, a machinist will always be able to regrind or redress the tools and perform his work uniformly and accurately.

22 represents a square hole formed through the head of the bolt or detachable member shown in Fig. 5, into which may be fitted or disposed a straight turning bit or tool 23, in case the latter form of tool should be desired instead of the disk tools. In order to hold this bar tool tightly in place, the slot or hole 22 is left open on the inner face side of the bolt head, and tool 23 is formed to a thickness laterally, greater than the portion of the slot which occurs on either side of the body of the bolt, so that when the bolt is tightened up by means of the nut, it will pinch and bind tool 23 between the bolt head and the face of the holder and thus hold it from longitudinal movement. To prevent the bolt from turning when tool 23 is used, several small sockets 24 are formed in the inner face of the bolt head. These sockets are for use in connection with the pin 12, and have the same function and use as the sockets 20 of tools 7 and 7′.

My improved circular tools are preferably made up in sets, comprising separate tools for cutting-off, turning, facing and cutting standard and V-threads, also some special cutters. One holder is provided for each set, by means of which the tools are readily interchangeable, and a machinist or lathe-tender may change the tools in a few seconds' time.

To attach one of my disk tools to the holder, the nut 10 is removed and bolt 6 withdrawn. The bolt is then inserted through the central hole 18 in the tool from the side opposite the sockets 20, and also through the hole 5 of the stock, and then the nut is replaced. Before tightening up the nut the tool should be adjusted so that the cutting point 16 will stand at the proper angle for making the desired cut, and the pin 12 should be inserted in one of the sockets 20. Then when the bolt and nut are tightened up, the tool will be drawn tightly against the rear face of the shank-head and the tool cannot shift out of position unless the nut is loosened. After the tool is set as described, the stock may be placed in the slide-rest of a lathe and adjusted in a suitable manner for doing the work. In case the cutting point 16 becomes broken or dulled, so that the tool cannot make the proper cut, the operator may remove the stock from the slide-rest and grind or dress the cutting parts 15 and 16 without removing the tool from the stock. The disk comprising a tool is preferably formed a trifle thicker near the peripheral edge than it is between that portion and the sockets, especially in the case of the cutting-off tools, so that the tool will not bind while cutting into a piece of metal. Each tool is formed to the same cross-section all the way around the outer edge or rim, so that when redressing a tool after it becomes dulled or broken, it is only necessary to grind the face or edge of the angle 15 till the point 16 is made sharp or full, after which the tool will again be ready for use, and the cutting will be the same, because the shape or form of the tool does not change if the grinding is done as described.

During the cutting or turning of metal with my circular tools, the strain of the work exerted against the jaws 15 tends to force the points 16 downwardly, and to cause it to revolve on the bolt 6. To overcome this tendency of the tools to yield or to be forced out of position, I provide the pin 12 and the sockets 20, and dispose these parts about half way between the bolt and the cutting points 16 in a manner to resist all ordinary strains. Under this construction and arrangement of the parts, if a tool is fed too rapidly, and digs into the metal, or encounters a hard particle of metal which produces an unusual strain on the jaw 15, the pin 12 being comparatively light, will be sheared off before the tool will break. In case pin 12 is sheared or broken off, as described, the operator may remove the screw 13 from the outer end of hole 11, drive the broken pin out, and insert a new one, and then replace the screw.

My improved lathe tools and holder are extremely simple in construction and operation, and afford a means for accomplishing the several kinds of lathe work referred to, in a ready, accurate and uniform manner. The complete device comprises but few parts and these may be made strong, and the whole produced and maintained at a small cost.

Obviously some changes or modifications may be made in the parts of the device without departing from the spirit of the invention, and I therefore do not restrict myself to the precise construction and arrangement as described and shown.

Having thus described my invention, what I claim as new and desire to secure by Letters Patent, is—

1. In a tool of the class described, the combination of a holder, a cutting tool mounted thereon and consisting of a detachable member provided with a cutter, means for holding the cutter in an adjusted position upon the holder and comprising a pin, the detachable member aforesaid having a plurality of sockets any one of which is adapted to receive an end of said pin, the holder having an opening therein to receive the other end of the pin, and a removable member applied to the holder to prevent displacement of the pin therefrom, and permitting of ready removal of the pin from the holder should the socket received portion thereof be sheared off.

2. In a tool of the class described, the combination of a holder, a cutting tool mounted thereon and rotatable about an axis, said tool embodying a plurality of sockets arranged concentrically with relation to the axis thereof and the holder having a transverse opening therethrough of which the outer portion is enlarged and threaded, a pin seated in the inner portion of the opening of the holder and having one end arranged in one of the sockets of the cutting tool, and a detachable screw member in the outer threaded portion of the aforesaid opening in the holder for preventing displacement of the pin and facilitating its removal should its socket received portion become sheared off.

In testimony whereof I affix my signature in presence of two witnesses.

BYRON A. HEMENWAY.

Witnesses:
EDGAR V. BLOODOUGH,
HARRY DE WALLACE.